US008929862B2

(12) United States Patent  (10) Patent No.: US 8,929,862 B2
Popovich et al. (45) Date of Patent: Jan. 6, 2015

(54) METHOD AND APPARATUS FOR ATTACHING A WIRELESS DEVICE TO A FOREIGN 3GPP WIRELESS DOMAIN USING ALTERNATIVE AUTHENTICATION MECHANISMS

(75) Inventors: George Popovich, Palatine, IL (US); Shanthi E. Thomas, Carpentersville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 307 days.

(21) Appl. No.: 13/178,612

(22) Filed: Jul. 8, 2011

(65) Prior Publication Data

US 2013/0012165 A1     Jan. 10, 2013

(51) Int. Cl.
*H04M 1/66* (2006.01)
*H04W 12/06* (2009.01)
*H04L 29/06* (2006.01)
*H04W 60/00* (2009.01)

(52) U.S. Cl.
CPC ............... *H04W 12/06* (2013.01); *H04L 63/08* (2013.01); *H04W 60/00* (2013.01)
USPC ........................................ 455/411; 455/435.1

(58) Field of Classification Search
USPC ........................ 455/411, 435.1; 380/44, 247
See application file for complete search history.

(56) References Cited

U.S. PATENT DOCUMENTS

| | | | |
|---|---|---|---|
| 6,876,747 B1 | 4/2005 | Faccin et al. | |
| 6,967,177 B1 * | 11/2005 | May et al. | 438/798 |
| 7,039,190 B1 | 5/2006 | Engwer et al. | |
| 7,181,012 B2 | 2/2007 | Arkko et al. | |
| 7,512,783 B2 | 3/2009 | Naghian et al. | |
| 7,529,933 B2 | 5/2009 | Palekar et al. | |
| 7,639,802 B2 * | 12/2009 | Gundavelli et al. | 380/44 |
| 7,873,163 B2 | 1/2011 | Quick et al. | |
| 8,332,912 B2 | 12/2012 | Naslund et al. | |

(Continued)

FOREIGN PATENT DOCUMENTS

| | | |
|---|---|---|
| EP | 1701505 A1 | 9/2006 |
| WO | 2007139883 A2 | 12/2007 |
| WO | 2008061570 A1 | 5/2008 |

OTHER PUBLICATIONS

Georgios Kambourakis, et al. "Experimental Analysis of an SSL-Based AKA Mechanism in 3G-and-Beyond Wireless Networks"; Department of Information and Communication Systems Engineering, University of the Aegean, Samos, Greece; 25 pages; 2004.

(Continued)

*Primary Examiner* — German J Viana Di Prisco
(74) *Attorney, Agent, or Firm* — Steven A. May (57) ABSTRACT

A method and apparatus for attaching a wireless device to a foreign wireless domain of a 3GPP communication system using an alternative authentication mechanism, wherein wireless device performs the method, which includes: sending a first attach request message to an infrastructure device in the foreign wireless domain; receiving an attach reject message from the infrastructure device upon an unsuccessful attempt to obtain authentication credentials for the wireless device from a home wireless domain of the wireless device using a standard 3GPP authentication mechanism; responsive to the attach reject message sending a second attach request message to the infrastructure device, wherein the second attach request message indicates an alternative authentication mechanism to the standard 3GPP authentication mechanism; and receiving an attach accept message from the infrastructure device when the wireless device is successfully authenticated using the alternative authentication mechanism.

16 Claims, 6 Drawing Sheets

(56) References Cited

U.S. PATENT DOCUMENTS

| | | | |
|---|---|---|---|
| 2005/0097320 A1* | 5/2005 | Golan et al. | 713/166 |
| 2006/0182280 A1* | 8/2006 | Laitinen et al. | 380/247 |
| 2010/0190497 A1* | 7/2010 | Pudney et al. | 455/435.1 |
| 2013/0013923 A1 | 1/2013 | Thomas et al. | |

OTHER PUBLICATIONS

3GPP TS 33.401 V9.7.0; 3rd Generation Partnership Project; Technical Specification Group Services and System Aspects; 3GPP System Architecture Evolution (SAE); Security Architecture, Release 9; Jun. 2011; 106 Pages.

3GPP TS 33.102 V9.4.0; 3rd Generation Partnership Project; Technical Specification Group Services and System Aspects; 3G Security; Security Architecture, Release 9; Dec. 2010; 72 Pages.

International Search Report and Written Opinion for International Patent Application No. PCT/US2012/045185 mailed on Oct. 1, 2012.

3rd Generation Partnership Project; Technical Specification Group Services and System Aspects; 3G Security; Access Security Fo Rip-Based Services (Release 11), 3GPP TS 33.203, 3rd Generation Partnership Project(3GPP), Mobile Competence Centre; 650, Route Des Lucioles; F-06921 Sophia-Antipolis Cedex; France No. V11.0.0, Dec. 30, 2010, pp. 1-114 XP050462482.

International Search Report and Written Opinion for related International Patent Application No. PCT/US2012/045186 mailed on Oct. 30, 2012.

Non Final Office Action mailed on Jul. 11, 2013 in related U.S. Appl. No. 13/178,650, Shanthi Thomas, filed Jul. 8, 2011.

Notice of Allowance mailed on Sep. 26, 2013 in related U.S. Appl. No. 13/178,650, Shanthi Thomas, filed Jul. 8, 2011.

Niemi, A., et al., "Hypertext Transfer Protocol (HTTP) Digest Authentication Using Authentication and Key Agreement (AKA)," Network Working Group, RFC 3310, Sep. 2002, 17 pages.

Dierks, T., et al., "The Transport Layer Security (TLS) Protocol Version 1.2," Network Working Group, RFC 5246, Aug. 2008, pp. 1-104.

Rescorla, E., et al., "Datagram Transport Layer Security," Network Working Group, RFC 4347, Apr. 2006, pp. 1-25.

Phelan, T., "Datagram Transport Layer Security (DTLS) over the Datagram Congestion Control Protocol (DCCP)," Network Working Group, RFC 5238, May 2008, pp. 1-10.

Kaufman, C., et al., "Internet Key Exchange Protocol Version 2 (IKEv2)," Internet Engineering Task Force (IETF), RFC 5996, Sep. 2010, pp. 1-138.

Tzeng Z-J, et al., "Authentication of Mobile Users in Third Generation Mobile Systems," Wireless Personal Communications, vol. 16, Issue 1, Jan. 2001, pp. 35-50.

Guangsong, L., et al., "A Novel Localized Authentication Protocol in 3G-WLAN Integrated Networks," International Conference on E-Business and E-Government, May 7, 2010, pp. 1285-1288.

3rd Generation Partnership Project; Technical Specification Group Services and System Aspects; General Packet Radio Service (GPRS) enhancements for Evolved Universal Terrestrial Radio Access Network (E-UTRAN) access (Release 10) 3GPP TS 23.401 V10.2.1 (Jan. 2011), pp. 1-276.

3rd Generation Partnership Project; Technical Specification Group Services and System Aspects; 3G Security; Security architecture (Release 10) 3GPP TS 33.102 V10.0.0 (Dec. 2012), pp. 1-72.

* cited by examiner

METHOD AND APPARATUS FOR ATTACHING A WIRELESS DEVICE TO A FOREIGN 3GPP WIRELESS DOMAIN USING ALTERNATIVE AUTHENTICATION MECHANISMS

REFERENCE TO RELATED APPLICATIONS

The present application is related to the following U.S. applications commonly owned together with this application by Motorola Solutions, Inc.:

Ser. No. 13/178,650, filed Jul. 8, 2011, titled "Methods for Obtaining Authentication Credentials for Attaching a Wireless Device to a Foreign 3GPP Wireless Domain" by Thomas, et al.

TECHNICAL FIELD

The present disclosure relates generally to wireless communications and, in particular, to methods for attaching a wireless device to a foreign wireless domain of a 3rd Generation Partnership Project (3GPP) communication system using alternative authentication mechanisms.

BACKGROUND

A 3GPP communication system often comprises numerous wireless networks (also interchangeably referred to herein as wireless domains), such as Long Term Evolution (LTE) networks, Universal Mobile Telecommunications System (UMTS) networks, Global System for Mobile Communications (GSM) networks, WiMax networks, etc (also referred to generally herein as 3GPP networks or 3GPP domains). Each 3GPP network includes one or more infrastructure devices, such as a Mobility Management Entity (MME) for instance, which provide connectivity, roaming, and other communication services to enable the communication of media to wireless devices (also interchangeably referred to herein as User Equipment (UE)). A wireless device is often associated with a designated wireless network. As used herein, the designated wireless network for the wireless device is termed a home wireless network (also interchangeably referred to herein as a home wireless domain, a home 3GPP wireless domain, and a home LTE wireless domain) to the wireless device. As mentioned above, a feature of the 3GPP communication system is roaming, which allows a wireless device to connect to wireless networks other than the home wireless network of the wireless device. As used herein, the wireless networks other than the home wireless network of the wireless device are termed as foreign wireless networks (also interchangeably referred to herein as foreign wireless domains, foreign 3GPP wireless domains, and foreign LTE wireless domains) to the wireless device.

As described in 3GPP standards, when a wireless device attaches (i.e., connects) to a foreign 3GPP wireless network, the foreign 3GPP wireless network attempts to authenticate and authorize the wireless device using a standard 3GPP authentication mechanism, which includes obtaining authentication credentials from the home 3GPP wireless network of the wireless device. To obtain such authentication credentials, the MME of the foreign wireless network contacts the Home Subscriber Servers (HSS) of the home wireless network through a standard 3GPP S6a interface.

In order to use the S6a interface, the foreign and home wireless networks must have a roaming agreement. However, such a roaming agreement requirement creates a scalability problem for the 3GPP communication system as the number of 3GPP domains in the system increases since roaming agreements between all of the networks would be required to achieve a fully meshed nation-wide network. Moreover, even in the presence of roaming agreements between wireless networks in the system, a communication link between two wireless networks may be broken or interrupted for various reasons, such as natural disasters. This would also prevent the foreign MME from obtaining the authentication credentials for the wireless device attempting to attach to the foreign 3GPP network.

Therefore, what is needed is a method for authenticating a wireless device to a foreign 3GPP network when the standard 3GPP authentication mechanism fails or is otherwise unavailable.

BRIEF DESCRIPTION OF THE FIGURES

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for attaching a wireless device to a foreign 3GPP wireless domain using alternative authentication mechanisms when the standard mechanism fails. In accordance with the present teachings, a method performed by a wireless device includes sending a first attach request message to an infrastructure device in a foreign wireless domain, such as a foreign LTE network, in a 3GPP communication system. The method further includes receiving an attach reject message from the infrastructure device upon an unsuccessful attempt to obtain authentication credentials for the wireless device from a home wireless domain, such as a home LTE network, of the wireless device using a standard 3GPP authentication mechanism. The authentication credentials include, but are not limited to, a set of (meaning one or more) authentication vectors. In addition, the method includes sending a second attach request message to the infrastructure device in response to the attach reject message. The second attach request message indicates one or more alternative authentication mechanism to the standard 3GPP authentication mechanism. Moreover, the method includes receiving an attach accept message from the infrastructure device when the wireless device is successfully authenticated using the alternative authentication mechanism.

Further in accordance with the present teachings, a method performed by the infrastructure device in the foreign wireless domain includes receiving, from the wireless device, the first attach request message. The method further includes, upon failure to obtain authentication credentials for the wireless device from the home wireless domain, sending the attach reject message to the wireless device. In addition, the method includes receiving, from the wireless device, the second attach request message, wherein the second attach request message indicates the alternative authentication mechanism to the standard 3GPP authentication mechanism. Further, the method includes, in response to the second attach request message, authenticating the wireless device using the alternative authentication mechanism, and sending the attach accept message to the wireless device upon successful authentication of the wireless device using the alternative authentication mechanism.

Figure 1:
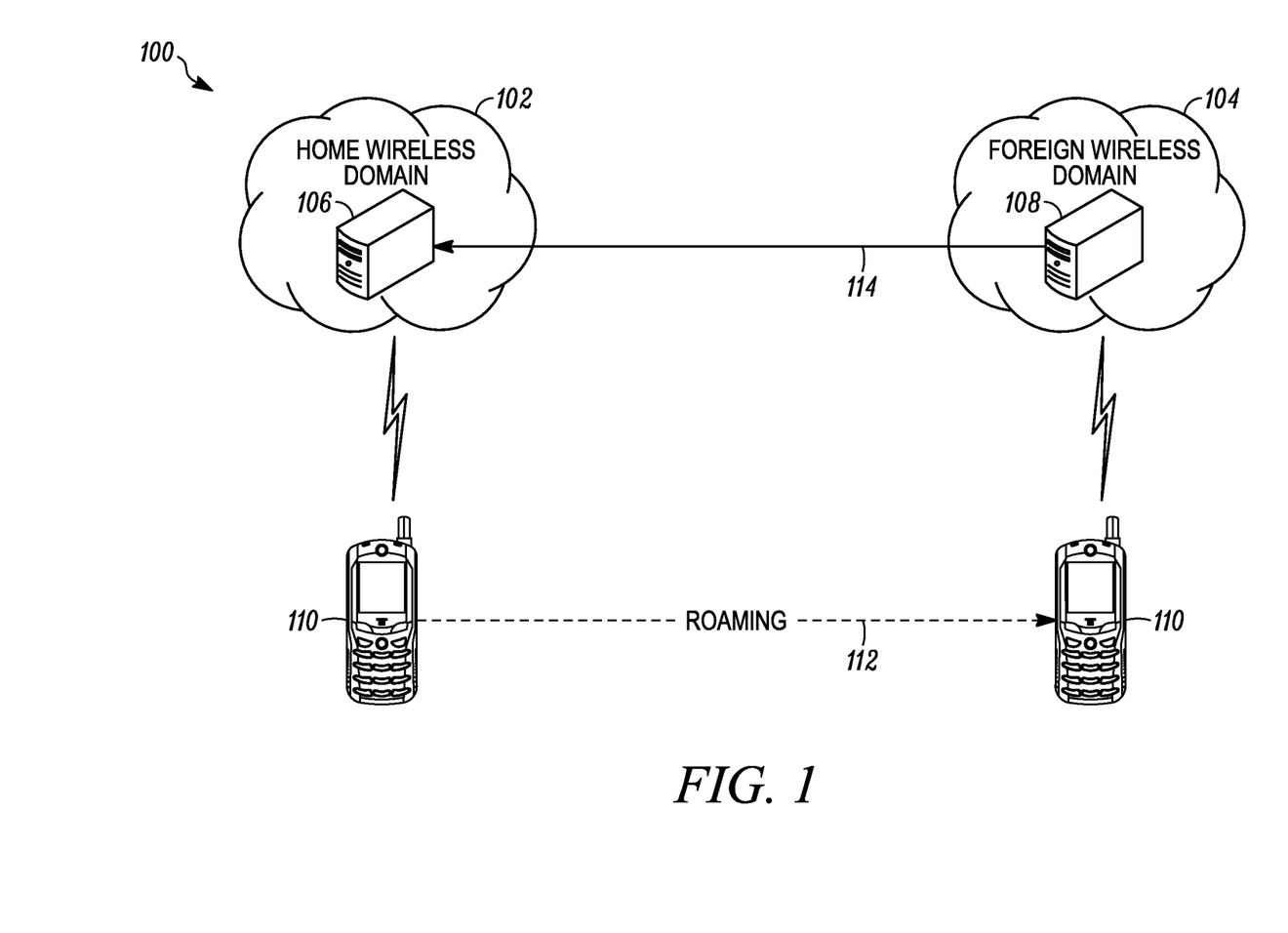
FIG. 1 illustrates a communication system implementing embodiments of the present teachings.

Referring now to the drawings, and in particular FIG. 1, an illustrative 3GPP communication system implementing embodiments in accordance with the present teachings is shown and indicated generally at 100. System 100 comprises two wireless domains (also interchangeably referred to herein as wireless networks), a home wireless domain 102 and a foreign wireless domain 104. As defined herein, a domain or network is a grouping of infrastructure devices that serves as a "home domain" for a set of wireless devices, meaning that the domain at least controls and manages authentication credentials for access to the 3GPP communication system for wireless devices associated with or subscribed to that domain. All other domains within a 3GPP communication system that are not the home domain for a given wireless device are defined as "foreign domains" for the wireless device. Authentication credentials are defined herein as data used to verify identity of a wireless device or a user of a wireless device and includes, but is not limited to, data such as one or more authentication vectors, a username, a password, an International Mobile Subscriber Identity (IMSI), etc.

Accordingly, in the implementation scenario illustrated by reference to FIG. 1, wireless network 102 controls the authentication credentials of a wireless device 110, and is thus termed as a home wireless domain to the wireless device 110. To the contrary, wireless network 104 lacks control or knowledge of the authentication credentials of the wireless device 110 (unless such credentials are provided to wireless network 104 by the home network 102 or the wireless device 110, for instance), and is thus termed as a foreign wireless domain to the wireless device 110.

System 100 may comprise additional wireless networks (not shown) and wireless devices (not shown). In a typical implementation scenario, at least some of the wireless networks within the communication system 100 are owned or administered by different entities, for example different public safety entities. For instance, system 100 may include a public land mobile network (PLMN), such as for one or more police or fire departments, or a commercial LTE network, etc. Moreover, at least some of the wireless networks within the communication system 100 may not have a mutual roaming agreement. Wireless networks 102 and 104 include a number of infrastructure devices for facilitating communications for wireless devices. Such infrastructure devices may include, but are not limited to, bridges, switches, zone controllers, base station controllers, repeaters, base radios, base stations, base transceiver stations, gateways, home subscriber servers (HSS), Mobility Management Entities (MMEs), evolved NodeBs (eNodeBs), access points, routers or any other type of infrastructure equipment interfacing a communication device in a wireless environment, particularly a 3GPP wireless environment.

In this illustrative implementation, wireless communication system 100 is a 3GPP communication system having a plurality of wireless domains, e.g., the home wireless network 102 and the foreign wireless network 104 that are 3GPP wireless networks meaning that the networks have infrastructure devices whose operation is compliant with a suite of 3GPP Technical Specifications (TSs) also referred to herein as 3GPP standards. Further in accordance with this illustrative implementation, wireless networks 102 and 104 are LTE networks. Therefore, wireless network 102 comprises an MME infrastructure device 106 and a HSS (not shown), and wireless network 104 comprises an MME infrastructure device 108 and a HSS (not shown). Both network 102 and network 104 may comprise additional MME (not shown). MMEs provide functions related to connection management and bearer management. For example, an MME supports establishment of the connection and security between a wireless device and the LTE network in which the MME resides, and communication between an MME and a wireless device is via Non Access Stratum (NAS) protocols. The HSS manages real time subscriber information such as subscriber context and state. Moreover, although LTE networks are described herein, the teachings herein are not limited by the 3GPP network types shown or described herein but may be applied to other 3GPP wireless networks such as WiMax networks.

Both wireless networks 102 and 104 provide networking services for wireless devices, such as the wireless device 110. The wireless devices are also commonly referred to in the art as mobile devices, access devices, access terminals, mobile stations, mobile subscriber units, subscriber units, user devices, and the like. These communication devices can be any type of communication device such as radios, mobile phones, mobile data terminals, Personal Digital Assistants (PDAs), laptops, two-way radios, cell phones, etc.

As shown, the wireless device 110 is capable of connecting to both wireless networks 102 and 104. Wireless device 110 generally attaches to wireless network 102 using a standard 3GPP attach procedure comprising signaling as specified and described in the 3GPP standards. The standard 3GPP attach procedure enables a wireless network to connect to and authenticate wireless devices. The wireless devices are not allowed to use networking services of the wireless network unless the wireless devices are authenticated and the attach procedure is completed. Following the standard 3GPP attach procedure, the wireless device 110 sends MME 106 an attach request message, which is an initial message that starts the attach procedure. Generally, a wireless device communicates with an MME in a LTE network through an eNodeB device, which performs radio resource management, radio bearer control, connection mobility management, header compression, link encryption of the user data stream, packet routing, and other functions.

In response to this attach request message, MME 106 performs a standard 3GPP authentication mechanism meaning that the authentication mechanism (or process for authenticating) is as defined and described in the 3GPP standards, for example in 3GPP TSs 33.102 and 33.401, wherein the standard authentication mechanism uses Authentication and Key Agreement Protocol (AKA) as defined Internet Engineering Task Force (IETF) Request for Comments (RFC) 3310 dated May 20, 2002 (including previous or subsequent revisions). In accordance with the standard 3GPP authentication mechanism, the MME 106 retrieves authentication credentials for the wireless device 110 from another infrastructure device, such as the HSS (not shown) of wireless network 102. MME 106 communicates with the HSS of wireless network 102 via a standard 3GPP S6a interface. The authentication credentials include one or more authentication vectors that are sequentially ordered and are compliant with 3GPP TSs 33.102 and 33.401. Each authentication vector may contain a random number, an expected response, a cipher key, an integrity key, and an authentication token. One of the authentication vectors is then used by the MME 106 to authenticate and authorize the wireless device 110. To authenticate the wireless device 110, the MME 106 implements the AKA protocol. Upon successful authentication, the MME 106 sends wireless device 110 an attach accept message.

Oftentimes, wireless devices roam from one network to another network and demand the same or similar networking services from each network. Such interoperability between the networks is a beneficial feature of a 3GPP communication system since it enables a wireless device to communicate outside of its home wireless domain. For example, when wireless device 110 roams (represented as a dashed line 112 in FIG. 1) to wireless network 104, wireless device 110 attempts to attach to wireless network 104 by sending an attach request message to MME 108. In response to this attach request message, MME 108 determines that the home wireless network of wireless device 110 is wireless network 102, and then contacts (represented as a dashed line 114 in FIG. 1) MME 106 for authentication credentials for wireless device 110. Upon successful retrieval of authentication credentials from MME 106, MME 108 uses an authentication vector contained in the authentication credentials to authenticate and authorize wireless device 110 using the AKA protocol, in accordance with the standard 3GPP authentication mechanism. When MME 108 successfully authenticates wireless device 110, MME 108 sends wireless device 110 an attach accept message, which indicates successful connection of the wireless device 110 to wireless network 104.

However, MME 108 may fail to authenticate wireless device 110 for various reasons. For example, A HSS in the home wireless domain 102 may deny the request for authentication credentials from MME 108 due to a lack of a roaming agreement between the foreign wireless domain 104 and the home wireless domain 102. In another example, MME 108 may fail to connect to the HSS in the home wireless domain 102 due to a broken network link caused by natural disasters or other events. When MME 108 fails to authenticate wireless device 110 through the standard 3GPP authentication mechanism, embodiments of the present disclosure are performed to enable a wireless device to authenticate to the foreign wireless domain using an alternative authentication mechanism to the standard 3GPP authentication mechanism.

In general, the wireless devices 110 and infrastructure devices, such as MMEs 106 and 108, of wireless networks 102 and 104 of system 100 are implemented using one or more (although not shown) memory devices, network interfaces, and processing devices that are operatively coupled, and which when programmed form the means for these system elements to implement their desired functionality, for example, as illustrated by reference to the methods and message sequence diagrams shown in FIGS. 2-6.

The processing device utilized by the elements of system 100 may be partially implemented in hardware and, thereby, programmed with software or firmware logic or code for performing functionality described by reference to FIGS. 2-6; and/or the processing device may be completely implemented in hardware, for example, as a state machine or ASIC (application specific integrated circuit). The memory implemented by these system elements can include short-term and/or long-term storage of various information needed for the functioning of the respective elements. The memory may further store the software or firmware for programming the processing device with the logic or code needed to perform its functionality.

Figure 2:
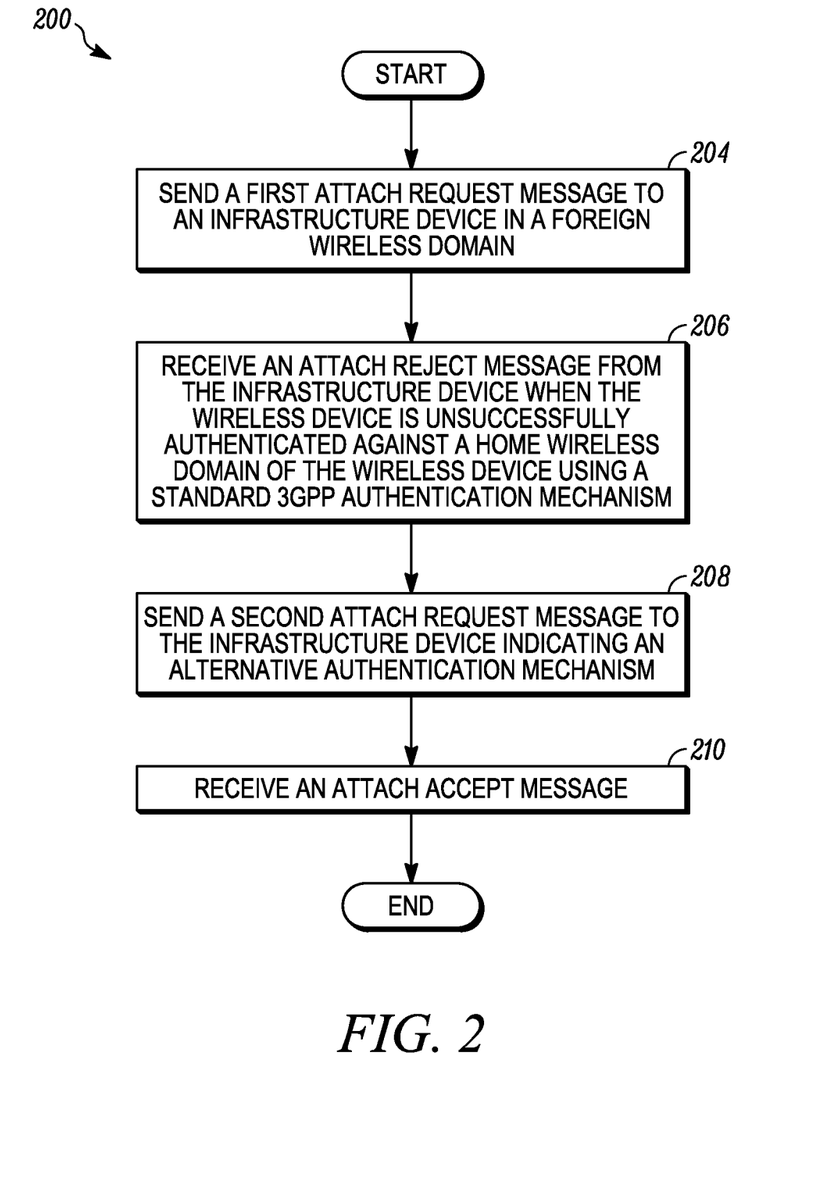
FIG. 2 is a logical flowchart illustrating a general method occurring at the wireless device in accordance with some embodiments.
Figure 3:
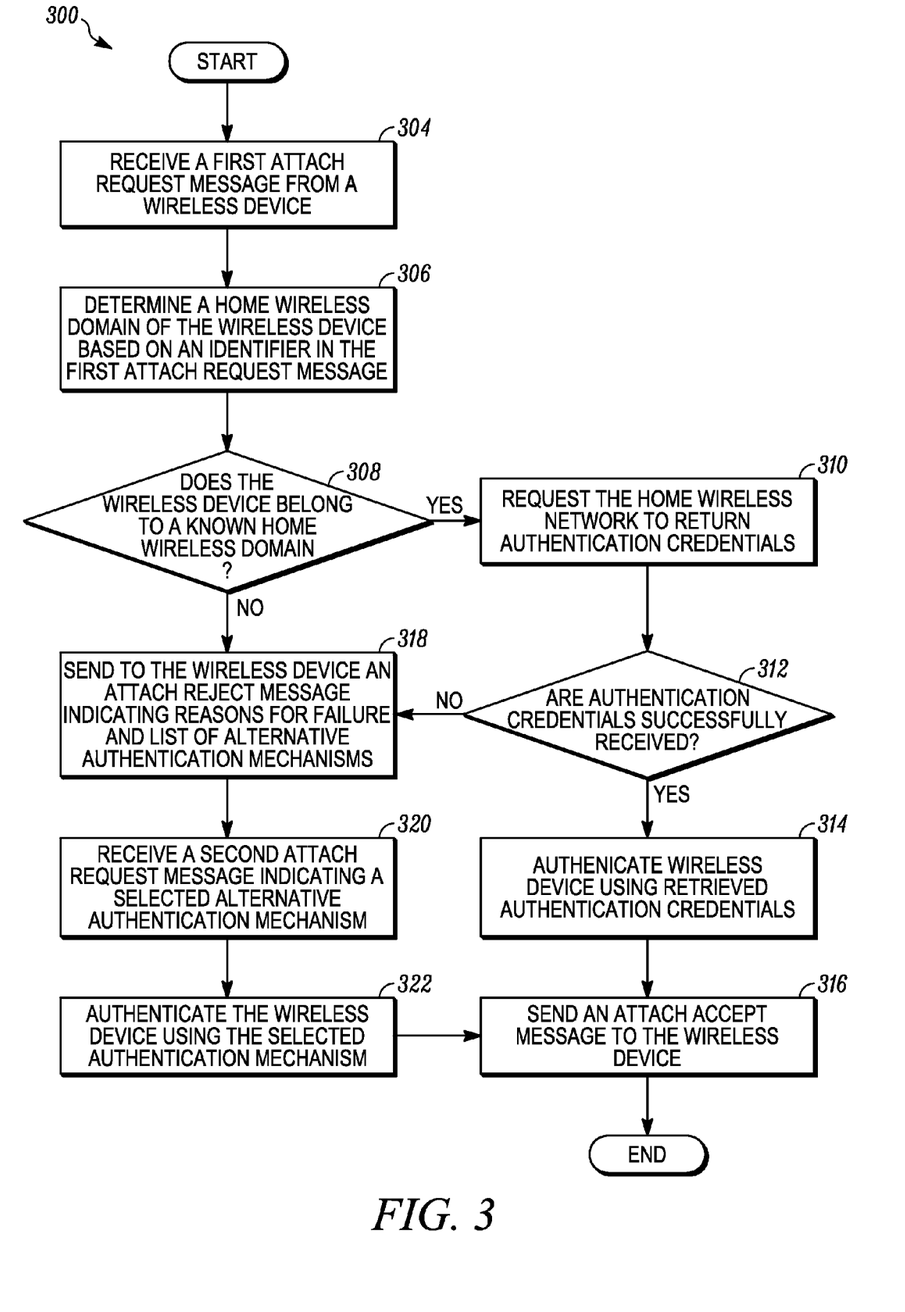
FIG. 3 is a logical flowchart illustrating a method occurring at the foreign MME in accordance with some embodiments.

We now turn to a detailed description of the functionality of the system 100 elements in accordance with the teachings herein and by reference to the remaining figures. FIG. 2 illustrates a logical flow diagram showing a general method 200, in accordance with an embodiment of the present disclosure, performed by a wireless device to attach to a foreign wireless network of a 3GPP communication system (such as the communication system 100) using an alternative authentication mechanism. FIG. 3 illustrates a logical flow diagram showing a general method 300, in accordance with an embodiment of the present disclosure, performed by an infrastructure device of the foreign wireless network when the wireless device attaches to the foreign wireless network using the alternative authentication mechanism. For ease of illustration methods 200 and 300 are described by reference to the elements of system 100 (FIG. 1), wherein, the wireless device is wireless device 110 of FIG. 1, the home wireless domain is LTE network 102 of FIG. 1, and the foreign wireless domain is LTE network 104 of FIG. 1.

When the wireless device roams into a foreign wireless network, the wireless device attempts to attach to the foreign wireless network by sending, at 204, an attach request message to an infrastructure device, such as MME 108 in FIG. 1, of the foreign wireless network. In a particular embodiment of FIG. 2, the attach request message is sent after a Radio Resource Control (RRC) connection is established between the wireless device and an eNodeB of the foreign wireless network. In one embodiment, the attach request message is a standard 3GPP attach request message, as described in the 3GPP TSs, which indicates identification and security capabilities of the sending wireless device. For example, an International Mobile Subscriber Identifier (IMSI) of the wireless device is specified in the attach request message, which the foreign MME can use to identify the home domain of the wireless device. This can be done for instance using an IMSI to wireless network ID mapping table. Alternatively, the standard attach request message is modified to include an identifier of the home domain of the wireless device. Any suitable identifier can be included in the attach request message to identify the wireless device and/or its home domain.

As described in more detail below, in response to the attach request message, the infrastructure device of the foreign wireless network uses the identity of the wireless device to contact the correct home wireless network to perform a standard 3GPP authentication mechanism, wherein the foreign MME attempts to retrieve authentication credentials for the wireless device. However, the home wireless network may deny such request for various reasons, such as there not being a roaming agreement between the home and foreign wireless network. Additionally, the home wireless network might be not reachable due to a link being down between the foreign MME and home network HSS because of a natural disaster, system problems, or other reasons. Upon failure to obtain the authentication credentials for the wireless device from the home wireless network of the wireless device, the infrastructure device of the foreign wireless network sends an attach reject message to the wireless device. At 206, the wireless device receives the attach reject message, which indicates that the wireless device's attach request has been denied.

In one embodiment, the attach reject message is a standard 3GPP messages, as described in the 3GPP TSs. In such a case, the wireless device is programmed with a set of one or more alternative authentication mechanisms from which to choose, or the set of alternative authentication mechanisms can be indicated by the foreign MME to the wireless in a separate message. Each alternative authentication mechanism differs in some way from the standard 3GPP authentication mechanism. In an alternative embodiment, the attach reject message differs from a standard 3GPP attach reject message in that the attach reject message itself indicates to the wireless device the set alternative authentication mechanisms. Such an indication within the message may be performed using any suitable mechanism. In one embodiment, the standard 3GPP attach reject message is modified to include a new information field that contains a value which indicates the capability of the foreign MME of performing one or more alternative authentication mechanisms. The modified standard 3GPP attach reject message may further indicate data for a shared secret derivation between the wireless device and the foreign wireless network, as described further below.

The set of alternative authentication mechanisms may include, but are not limited to, a certificate based authentication protocol for instance as described below, a standard Transport Layer Security (TLS) protocol for example as defined in IETF RFC 5246 dated August 2008 (including any previous or subsequent revisions), a standard Datagram Transport Layer Security protocol (DTLS) for example as defined in IETF RFCs 4347 dated April 2006 and 5238 dated May 2008 (including any previous or subsequent revisions), a standard Internet Key Exchange (IKE)v2 protocol for example as defined in IETF RFC 5996 dated September 2010 (including any previous or subsequent revisions), an authenticated Diffie-Hellman key management protocol for instance as described below, a method to store and forward a set of one or more authentication vectors for instance as described below, to name a few.

At 208, the wireless device selects an alternative authentication mechanism from the set of alternative authentication mechanisms, and sends to the infrastructure device in the foreign domain a subsequent attach request message, which indicates the selected alternative authentication mechanism. As discussed in more detail below, upon receiving the subsequent attach request message, the infrastructure device authenticates the wireless device using the selected alternative authentication mechanism. Upon successful authentication of the wireless device using the selected alternative authentication mechanism, the infrastructure device sends an attach accept message to the wireless device, which can be a standard attach accept message, as defined in the 3GPP TSs.

At 210, the wireless device receives the attach accept message, thereby, indicating that the wireless device has been successfully attached or connected to the foreign wireless network.

Referring now to the companion method 300 of FIG. 3, at 304, the foreign infrastructure device (e.g., the MME 108 in the foreign wireless domain 104) receives an attach request message from a wireless device that roams into the coverage area of an eNodeB of the foreign wireless domain 104. In an embodiment, the attach request message is a standard 3GPP attach request message, which begins the attach process described in the 3GPP standards and which identifies the wireless device, e.g., using an IMSI or any other suitable identifier. The attach request message may contain identification of the home wireless network of the wireless device.

At 306, the foreign infrastructure device examines the attach request message. If the attach request message contains identification of the home wireless network of the wireless device, the foreign infrastructure device determines the home wireless network and infrastructure devices, such as the MME and HSS, of the home wireless network from such identification information. When the attach request message does not contain identification of the home wireless network of the wireless device, the foreign infrastructure device may utilize one of several methods to identify the home wireless network. For example, the foreign infrastructure device maintains a mapping of wireless device identifiers to the corresponding home wireless network identifiers. Under this approach, the foreign infrastructure device retrieves an identifier, such as an IMSI identifier, of the wireless device from the first attach request message, and retrieves identifiers of the corresponding home wireless network from the mapping using the retrieved identifier of the wireless device.

At 308, the foreign infrastructure device checks whether the home wireless network has been identified. If the home wireless network has been identified at 306, the foreign infrastructure device contacts a HSS of the home wireless network through a standard 3GPP S6a interface to retrieve authentication credentials, such as authentication vectors, for the wireless device. Typically, each authentication vector comprises a network challenge random number, an expected response, a base security key, and a network authentication token. The request to the home HSS for authentication credentials comprises identification of the wireless device. Such request may fail for various reasons. For example, the HSS of the home wireless network may be down and cannot be reached for the requested authentication credentials. Another reason is that the home HSS cannot be reached due to natural disaster or other events. Additionally, the home HSS may deny the request for authentication credentials under various conditions. For example, the home HSS may deny the request for authentication credentials when the request does not provide sufficient or valid identification information.

If the home wireless network of the wireless device has been identified at 306, the foreign infrastructure device then requests for authentication credentials for the wireless device from the home wireless network at 310. At 312, the foreign infrastructure device determines whether authentication credentials have been obtained successfully. If authentication credentials are not obtained successfully at 312, execution of method 300 transitions to 318. Otherwise, the foreign infrastructure device authenticates the wireless device by using the obtained authentication credentials and following the standard 3GPP AKA protocol at 314. Upon successful authentication of the wireless device, the foreign infrastructure device sends the wireless device an attach accept message indicating that the wireless device has been successfully attached to the foreign wireless network at 316.

Turning now back to 308, if the foreign infrastructure device fails to identify the home wireless network of the wireless device at 306, the foreign infrastructure device then sends an attach reject message to the wireless device at 318. The attach reject message indicates to the wireless device that the wireless device's attach request has been rejected. The attach reject message may further indicate reasons for which the attach request is rejected. Additionally, the attach reject message indicates alternative authentication mechanisms, different from the standard 3GPP authentication mechanism, which are supported by the foreign infrastructure device for authenticating wireless devices. The alternative authentication mechanisms may include, but are not limited to, a TLS protocol, a DTLS, an IKEv2 Internet Key Exchange protocol, a certificate based authentication protocol, an authenticated Diffie-Hellman key management protocol, or a mechanism of storing and forwarding one or more authentication vectors for the wireless device.

In response to the attach reject message, the wireless device sends to the foreign infrastructure device a subsequent attach request message, which indicates a selected alternative authentication mechanism from the set of alternative authentication mechanisms. At 320, the foreign infrastructure device receives the attach request message from the wireless device. Moreover, the foreign infrastructure device determines the selected alternative authentication mechanism indicated in the second attach request message. At 322, the foreign infrastructure device authenticates the wireless device using the selected alternative authentication mechanism. The authentication using the selected alternative authentication mechanism is further illustrated by reference to FIGS. 4-6.

After the wireless device is successfully authenticated using the selected alternative authentication mechanism, the foreign infrastructure device sends to the wireless device, at 316, an attach accept message, which indicates that the wireless device has been attached or connected to the foreign wireless network.

Figure 4:
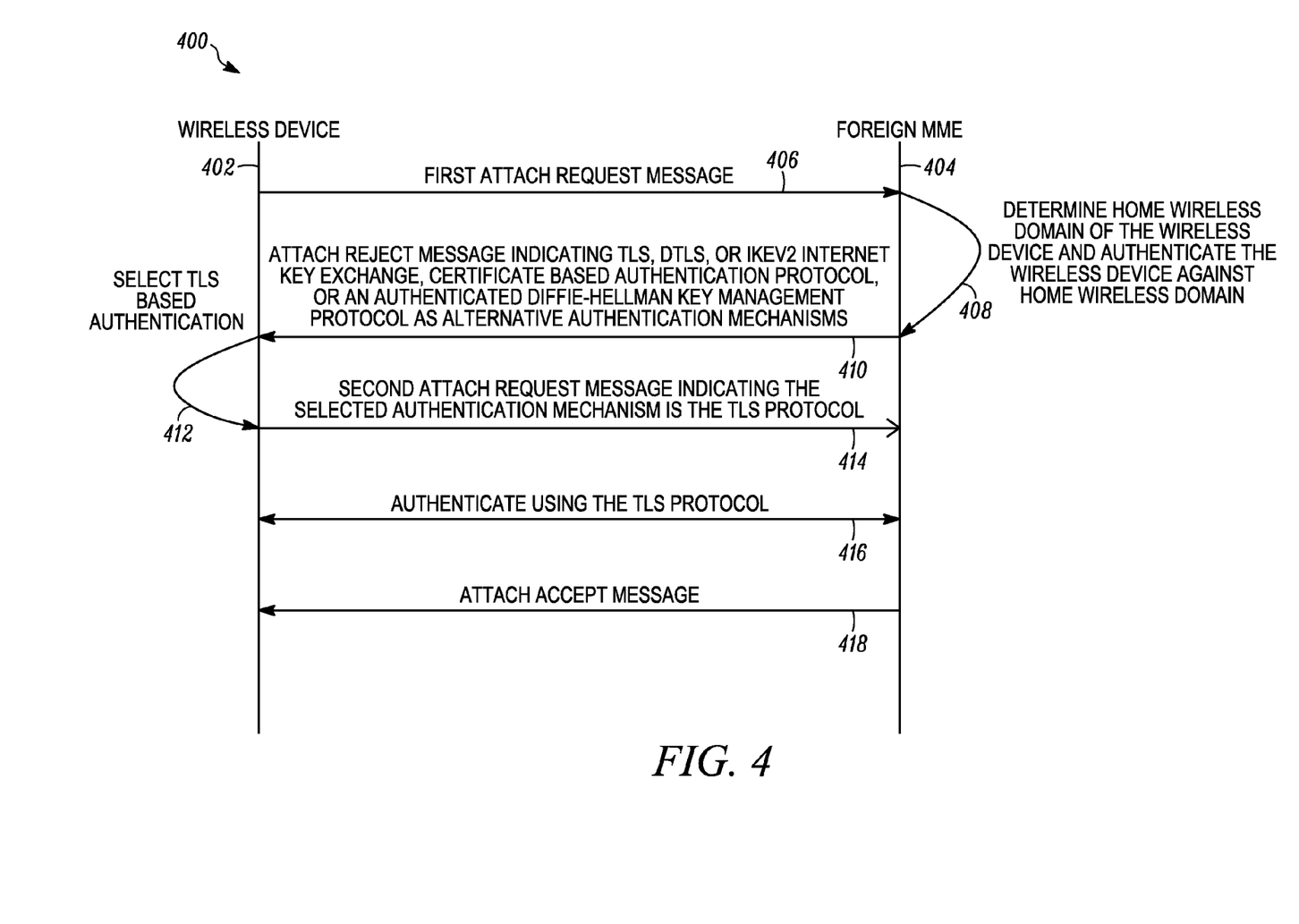
FIG. 4 illustrates a message sequence diagram in accordance with some embodiments.
Figure 5:
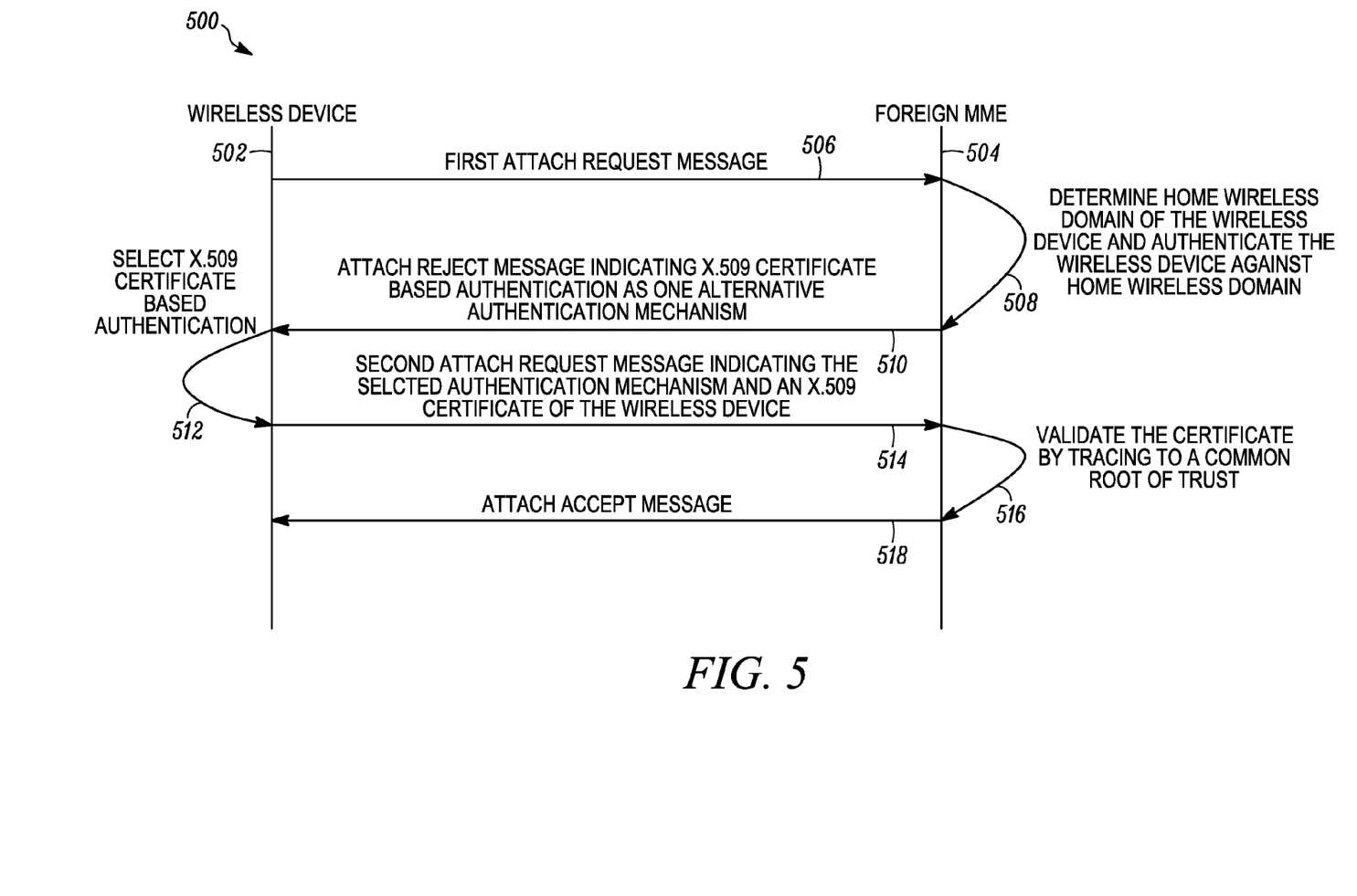
FIG. 5 illustrates a message sequence diagram in accordance with some embodiments.
Figure 6:
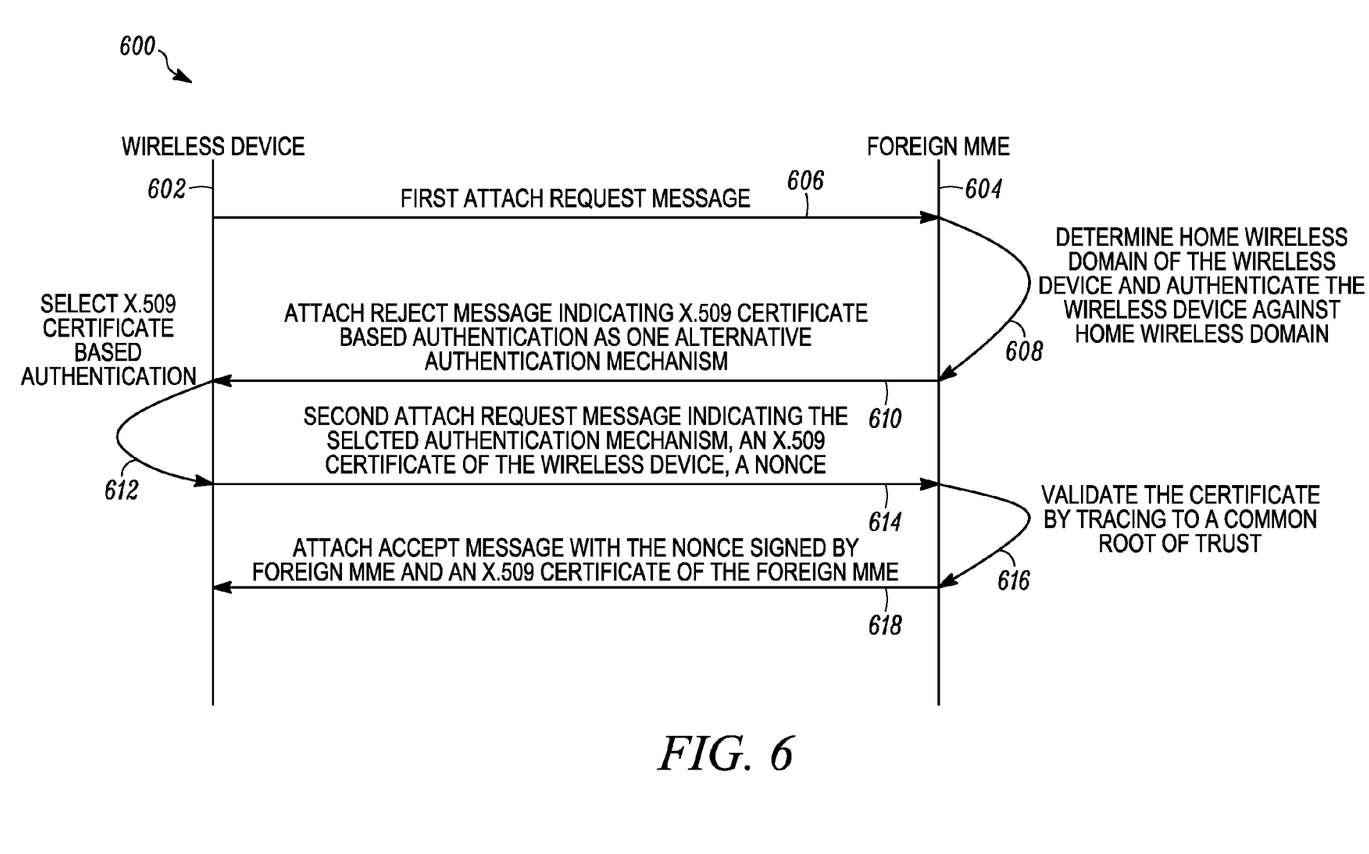
FIG. 6 illustrates a message sequence diagram in accordance with some embodiments.

Each of FIGS. 4-6 teaches a method for authenticating a wireless device to a foreign wireless network of the wireless device using an alternative authentication mechanism, in accordance with some embodiments of the present teachings. Turning first to FIG. 4, a message sequence diagram illustrating a method 400 in accordance with some embodiments of the present teachings is shown. In a particular embodiment of FIG. 4, a wireless device 402 is wireless device 110 of FIG. 1, and a foreign MME 404 is MME 108 of FIG. 1. At 406, the wireless device 402 sends the foreign MME 404 a first attach request message. In response to the first attach request message, the foreign MME 404 determines the home wireless network of wireless device 402 at 408. Moreover, the foreign MME 404 requests authentication credentials from the home wireless network of wireless device 402 at 408. When the foreign MME fails to obtain the authentication credentials, the foreign MME sends wireless device 402 an attach reject message at 410. The attach reject message indicates alternative authentication mechanisms, such as a TLS protocol, a DTLS protocol, an IKEv2 Internet Key Exchange protocol, a certificate based authentication protocol, or an authenticated Diffie-Hellman key management protocol.

In one particular embodiment of method 400, the wireless device 402 selects a TLS protocol as an alternative authentication mechanism at 412. At 414, the wireless device 402 sends a second attach request message to the foreign MME 404, indicating that the selected alternative authentication mechanism is the TLS protocol. In response to the second attach request message, the foreign MME 404 authenticates the wireless device 402 at 416. When the authentication is successful, the foreign MME 404 sends an attach accept message to the wireless device at 418.

In another particular embodiment of method 400, the wireless device 402 selects an authenticated Diffie-Hellman key management protocol as an alternative authentication mechanism at 412. At 414, the wireless device 402 sends a second attach request message to the foreign MME 404, indicating that the selected alternative authentication mechanism is the authenticated Diffie-Hellman key management protocol. In response to the second attach request message, at 416, the foreign MME 404 mutually authenticates with the wireless device 402 by agreeing to a base or master security key, and deriving one or more additional security keys from the base security key for secure communication between the wireless device and the foreign wireless network. For example, security keys used for protection of Non Access Stratum (NAS) protocol communication maybe derived from a base security key. When the authentication is successful, the foreign MME 404 sends an attach accept message to the wireless device at 418.

Referring now to FIG. 5, a message sequence diagram illustrating a method 500 in accordance with some embodiments of the present teachings is shown. In a particular embodiment of FIG. 5, a wireless device 502 is wireless device 110 of FIG. 1, and a foreign MME 504 is MME 108 of FIG. 1. At 506, the wireless device 502 sends the foreign MME 504 a first attach request message. In response to the first attach request message, the foreign MME 504 determines the home wireless network of wireless device 502 at 508. Moreover, the foreign MME 504 requests authentication credentials from the home wireless network of wireless device 502 at 508. When the foreign MME fails to obtain the authentication credentials, the foreign MME sends wireless device 502 an attach reject message at 510. The attach reject message indicates at least an X.509 certificate based authentication protocol as an alternative authentication mechanism, which includes the wireless device exchanging at least one digital certificate with the infrastructure device in the foreign wireless domain. A digital certificate or simple certificate is defined as an electronic document which uses a digital signature to bind a public key with an identity. Issued by a certification authority (CA), a digital certificate generally contains a name of the certificate holder, a serial number, expiration dates, a copy of the certificate holder's public, and the digital signature of the CA so that a recipient can verify that the certificate is real.

X.509 certificates are widely used digital certificates, and conform to a tree structure. The top-most certificate of the tree structure is termed the root certificate or common root of trust. A certificate authority issues multiple certificates in the form of the tree structure. All certificates of the certificate tree immediately below the root certificate inherit the trustworthiness of the root. Certificates further down the tree also depend on the trustworthiness of the intermediary certificates. Two certificates are termed to share or have a common root of trust if they can be traced to a single root certificate. For example, any two certificates in the tree of certificates can be traced to the top-most certificate of the tree. Accordingly, the two certificates have a common root of trust. Each branch of certificates on the tree is termed a trust domain.

At 512, the wireless device 502 selects the X.509 certificate based authentication protocol as the alternative authentication mechanism. At 514, the wireless device 502 sends a second attach request message, which indicates that the selected alternative authentication mechanism is the X.509 certificate based authentication protocol, to the foreign MME 504. Such an indication in the second attach request message is provided, for example, by the wireless device 502 including at least its X.509 certificate in the second attach request message and signing the second attach message using the private key corresponding to the public key present in its X.509 certificate. This will provide source of origin authentication to the infrastructure device. Moreover, the wireless device 502 may include all intermediary certificates of the trust domain of the wireless device 502, between the certificate of the wireless device and the root certificate.

At 516, in response to the second attach request message, the foreign MME 504 authenticates the wireless device 502 by validating the signature and verifying the validity and revocation status of the X.509 certificates contained in the first attach request message. When the first attach request message contains only the X.509 certificate of the wireless device 502, the foreign MME 504 may query a central repository (not shown) for the intermediary certificates of the trust domain of the wireless device 502. The foreign MME 504 authenticates the wireless device 502 by first chaining the X.509 certificate of the wireless device 502 and all intermediary certificates of the trust domain of the wireless device 502. The foreign MME 504 then traces the chain of certificates to a trust anchor of the foreign MME 504. Upon tracing to its trust anchor, the foreign MME 504 sends an attach accept message, indicating that the wireless device 502 has been successfully authenticated, to the wireless device at 518.

Additionally, the foreign MME 504 may include an X.509 certificate of MME 504 and a base or master security in the attach accept message. The base security key, encrypted using a public key of the wireless device, is used to derive additional security keys for secure communication between the wireless device and the foreign wireless network. For example, security keys used for protection of NAS protocol communication maybe derived from a base security key. Upon receiving the attach accept message, the wireless device validates the X.509 certificate of MME 504 by tracing to a common root of trust.

Alternatively, the wireless device 502 includes its X.509 certificate in the first attach request message at 506. In such cases, the foreign MME 504 would authenticate the wireless device 502 using the X.509 certificate based authentication mechanism when the foreign MME 504 fails to retrieve authentication credentials at 508. In addition, the foreign MME 504 would not send the attach reject message at 510.

The message exchanges of method 500 might be vulnerable to network replay attacks. Accordingly, mitigation of replay attacks is illustrated by references to FIG. 6. Turning now to FIG. 6, a message sequence diagram illustrating a method 600 in accordance with some embodiments of the present teachings is shown. In a particular embodiment of FIG. 6, a wireless device 602 is wireless device 110 of FIG. 1, and a foreign MME 604 is MME 108 of FIG. 1. At 606, the wireless device 602 sends the foreign MME 604 a first attach request message. In response to the first attach request message, the foreign MME 604 determines the home wireless network of wireless device 602 at 608. Moreover, the foreign MME 604 requests authentication credentials from the home wireless network of wireless device 602 at 608. When the foreign MME fails to obtain the authentication credentials, the foreign MME sends wireless device 602 an attach reject message at 610. The attach reject message indicates an X.509 certificate based authentication protocol as an alternative authentication mechanism.

At 612, the wireless device 602 selects the X.509 certificate based authentication protocol as the alternative authentication mechanism. At 614, the wireless device 602 sends a second attach request message, which indicates that the selected alternative authentication mechanism is the X.509 certificate based authentication protocol, to the foreign MME 604. The second attach request message further includes a nonce, and the second attach request message is signed using a private key of the wireless device 602. A nonce is number that is used only once to avoid network replay attacks. The wireless device 602 also includes its X.509 certificate in the second attach request message. Moreover, the wireless device 602 may include all intermediate certificates of the trust domain of the wireless device 602.

At 616, in response to the second attach request message, the foreign MME 604 authenticates the wireless device 602 by verifying the attach request signature and the X.509 certificates contained in the first attach request message. When the first attach request message contains only the X.509 certificate of the wireless device 602, the foreign MME 604 may query a central repository (not shown) for the intermediary certificates of the trust domain of the wireless device 602. The foreign MME then traces a path from the certificate of the wireless device 602, to one of its trust anchors. On successful certificate path validation to one of its trust anchors, the foreign MME 604 sends an attach accept message, indicating that the wireless device 602 has been successfully authenticated, to the wireless device 618. The attach accept message includes the nonce sent by the foreign MME 604 in the second attach request message. The attach accept message with the nonce is signed using a private key of the foreign MME 604. In alternate embodiments, both methods 500 and 600 can be performed using other types of certificate technologies, instead of X.509 certificate technology.

Alternatively, a wireless device requests for a set of authentication vectors from a home wireless network of the wireless device, and stores the set of authentication vectors for attaching to foreign wireless networks. For example, upon each successful attachment to the home wireless network, the wireless device retrieves a set of authentication vectors from the home wireless network. When the wireless device receives an attach reject message from a foreign wireless network, the wireless device sends the set of authentication vectors in a second attach request message to the foreign wireless network. Upon detection of presence of authentication vectors in the second attach request message, an MME in the foreign wireless network uses one of the authentication vectors and the standard 3GPP AKA protocol to authenticate the wireless device.

Persons of skill in the art will understand that this disclosure may be extended to other embodiments than those specifically disclosed herein. In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, and the like may be used solely to distinguish one entity or action from another entity or action without necessarily requiring or implying any actual such relationship or order between such entities or actions. The terms "comprises," "comprising," "has," "having," includes," "including," "contains," "containing," or any other variation thereof, are intended to cover a non-exclusive inclusion, such that a process, method, article or apparatus that comprises, has, includes, contains a list of elements does not include only those elements but may include other elements not expressly listed or inherent to such process, method, article, or apparatus. An element proceeded by "comprises . . . a", "has . . . a", "include . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed. Also, the sequence of steps in a flow diagram or elements in the claims, even when preceded by a letter does not imply or require that sequence.

Moreover, an embodiment can be implemented as a computer-readable storage medium having computer readable code stored thereon for programming a computer (e.g., comprising a processor) to perform a method as described and claimed herein. Examples of such computer-readable storage medium include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for attaching a wireless device to a foreign wireless domain of a 3rd Generation Partnership Project (3GPP) communication system using an alternative authentication mechanism, the method comprising:
a wireless device, associated with a home wireless domain of a 3GPP communication system, performing:
sending a first attach request message to an infrastructure device in a foreign wireless domain of the 3GPP communication system;
receiving an attach reject message from the infrastructure device upon an unsuccessful attempt to obtain authentication credentials for the wireless device from the home wireless domain using a standard 3GPP authentication mechanism, wherein the attach reject message indicates a set of alternative authentication mechanisms to the standard 3GPP authentication mechanism;
responsive to the attach reject message sending a second attach request message to the infrastructure device, wherein the second attach request message indicates an alternative authentication mechanism selected from the set; and
receiving an attach accept message from the infrastructure device when the wireless device is successfully authenticated using the alternative authentication mechanism.

2. The method of claim 1, wherein the standard 3GPP authentication mechanism uses an Authentication and Key Agreement protocol.

3. The method of claim 1, wherein the alternative authentication mechanism comprises one of a Transport Layer Security protocol, a Datagram Transport Layer Security protocol, or an IKEv2 Internet Key Exchange protocol.

4. The method of claim 1, wherein the alternative authentication mechanism comprises an authenticated Diffie-Hellman key management protocol, the method further comprising:
mutually authenticating with the infrastructure device;
agreeing to a base key; and
deriving at least one additional security key from the base key.

5. The method of claim 1, wherein the alternative authentication mechanism comprises a certificate-based authentication mechanism that includes the wireless device exchanging at least one digital certificate with the infrastructure device in the foreign wireless domain.

6. The method of claim 5, wherein:
the second attach request message includes a certificate of the wireless device;
the attach accept message includes a certificate of the infrastructure device and a base key for deriving at least one additional encryption key, wherein the base key is encrypted using a public key of the wireless device.

7. The method of claim 6, wherein:
the second attach request message includes a nonce, and wherein the second attach request message is signed using a private key of the wireless device;
the attach accept message includes the nonce, and wherein the attach accept message is signed using a private key of the infrastructure device.

8. The method of claim 5, wherein the at least one digital certificate comprises a certificate of the wireless device and an intermediate certificate between the certificate of the wireless device and a root certificate.

9. The method of claim 1, wherein the alternative authentication mechanism comprises the wireless device:
storing a set of authentication vectors for authenticating the wireless device to the foreign wireless domain;
forwarding the set of authentication vectors to the infrastructure device with the second attach request message.

10. A method for attaching a wireless device to a foreign wireless domain of a 3rd Generation Partnership Project (3GPP) communication system using an alternative authentication mechanism, the method comprising:

an infrastructure device, in a foreign wireless domain of a 3GPP communication system, performing:

receiving, from a wireless device, a first attach request message;

attempting and failing to obtain authentication credentials for the wireless device from a home wireless domain using a standard 3GPP authentication mechanism, wherein the home wireless domain is associated with the wireless device;

sending an attach reject message to the wireless device, wherein the attach reject message indicates a set of alternative authentication mechanisms to the standard 3GPP authentication mechanism;

receiving, from the wireless device, a second attach request message, wherein the second attach request message indicates an alternative authentication mechanism selected from the set;

responsive to the second attach request message, authenticating the wireless device using the alternative authentication mechanism; and sending an attach accept message to the wireless device upon successful authentication of the wireless device using the alternative authentication mechanism.

11. The method of claim 10, wherein attempting and failing to obtain authentication credentials for the wireless device from the home wireless domain using the standard 3GPP authentication mechanism comprises:

receiving an identity of the wireless device with the first attach request;

determining an identity of the home wireless domain using the identity of the wireless device;

requesting a set of authentication vectors from the home wireless domain; and receiving a denial of the request for the set of authentication vectors from the home wireless domain.

12. The method of claim 11, wherein the standard 3GPP authentication mechanism uses an Authentication and Key Agreement protocol which uses the set of authentication vectors to authenticate the wireless device.

13. A method for attaching a user equipment to a foreign Long Term Evolution (LTE) network using an alternative authentication mechanism, the method comprising:

a user equipment, associated with a home LTE network, performing:

sending a first attach request message to a Mobility Management Entity (MME) in a foreign LTE network;

receiving an attach reject message from the foreign MME upon an unsuccessful attempt by the foreign MME to obtain authentication credentials for the wireless device from an MME in the home LTE network using a first authentication mechanism, wherein the attach reject message indicates a set of alternative authentication mechanisms to the first authentication mechanism;

responsive to the attach reject message, selecting one of the alternative authentication mechanisms from the set, and sending a second attach request message to the foreign MME, wherein the second attach request message indicates the selected alternative authentication mechanism; and receiving an attach accept message from the foreign MME when the wireless device is successfully authenticated using the selected alternative authentication mechanism.

14. The method of claim 13, wherein the authentication credentials comprises a set of authentication vectors.

15. The method of claim 14, wherein the first authentication mechanism comprises a standard 3rd Generation Partnership Project (3GPP) authentication mechanism.

16. The method of claim 15, wherein the standard 3GPP authentication mechanism implements an Authentication and Key Agreement protocol.

\* \* \* \* \*